United States Patent Office 2,979,548
Patented Apr. 11, 1961

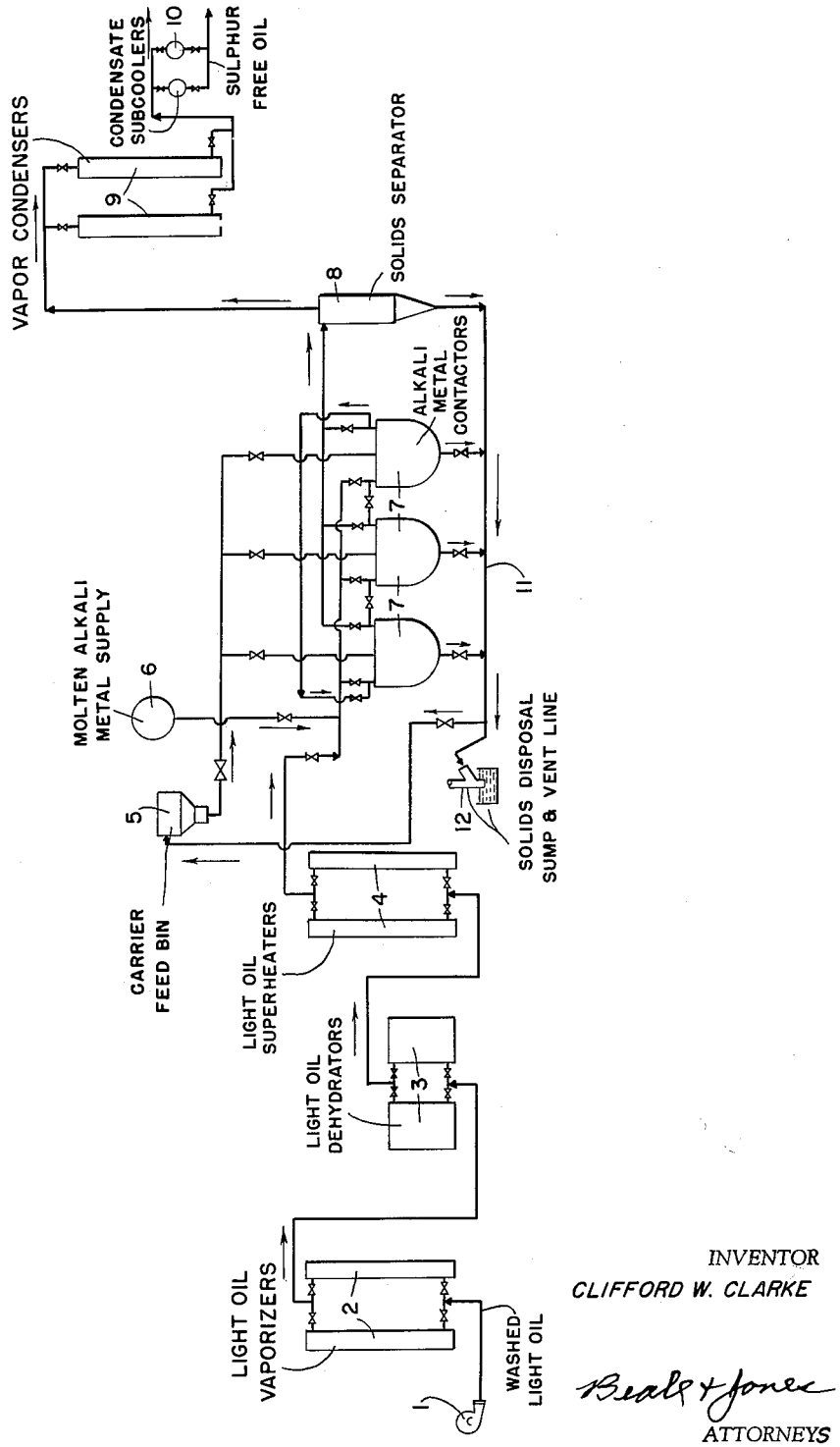

2,979,548

PURIFICATION OF AN AROMATIC-CONTAINING FEED BY SOLID ADSORPTION FOLLOWED BY CONTACT WITH MOLTEN ALKALI METAL

Clifford W. Clarke, Berkeley Heights, N.J., assignor to Otto Construction Corporation, New York, N.Y.

Filed Apr. 24, 1957, Ser. No. 654,825

2 Claims. (Cl. 260—674)

This invention relates to a process of purifying hydrocarbons containing impurities and more particularly to a process for continuously contacting vaporized hydrocarbon materials with molten metallic sodium, thereby removing those impurities in the hydrocarbon which react with sodium.

It has long been known to remove sulfur compounds from hydrocarbon oils by contacting them with metallic sodium. For instance, contacting such oil with metallic alkali and alkaline earth metals, said oil being in the liquid phase, is known. It has also been proposed to similarly contact hydrocarbon oils in the vapor phase. However, one problem is that the prior art has not found an entirely satisfactory method of substantially completely removing water, particularly for a vapor phase type of purification process, so that other steps of the process may be efficiently performed. For example, it has been proposed to utilize calcium chloride to diminish the water content of a hydrocarbon liquid before contact of the same with sodium. It has been found that calcium chloride does not lower the water concentration of the oil sufficiently. The importance of water removal is connected with the fact that moisture reacts with alkali metals, thus depleting the same, with the formation of hydrogen gas. The danger of hydrogen explosions is also present.

Selective adsorbents are known to be effective moisture removing agents, but have been thought to be undesirable in processes such as this since in the case of hydrocarbon oils, the adsorbent often adsorbs particular major constituents thereof which are desirably left as a part of the oil.

Briefly, the invention comprises vaporizing a hydrocarbon oil which contains water and sulfur compounds as impurities, dehydrating the vaporized hydrocarbon, preferably by means of a molecular sieve selective adsorbent, in some cases also adsorbing certain constituents of the hydrocarbons such as aliphatic compounds, contacting said vapors with molten alkali metal, preferably carried on a solid carrier, and recovering the purified hydrocarbon oil. The steps of the process may comprise pumping the impure oil to oil vaporizers, vaporizing the oil, conducting the vapor to dehydrating means and therein dehydrating the same, conducting the dehydrated oil to superheaters wherein it is heated to the optimum temperature for reaction of metallic sodium and the sulfur compounds contained in the oil vapor, contacting the superheated vapor with molten alkali metal carried on a hot carrier to convert sulfur compounds contained in the vapor to a separable form, separating the vapors from contact material and from impurities, and at least partially condensing the vapors to recover a sulfur-free oil.

The invention is particularly applicable to hydrocarbon oils consisting essentially of aromatic compounds such as benzene, toluene, and xylene. One source of such oil is coke oven gas. Another source is the distillation of coal tar which produces a material called "light oil," which will be used for illustrative purposes in the description of the invention. Light oil consists principally of benzene, toluene and xylene. The impurities in by-product coal chemical plant light oil consist chiefly of phenol, pyridine, hydrogen sulfide, carbon disulfide, mercaptans, thiophene, methyl thiophene, olefins, and paraffins. These impurities, with the exception of the olefins and paraffins, react with metallic sodium forming sodium sulfide, carbon, hydrogen, nitrogen, sodium phenolate, and low-boiling paraffins and olefins. Of the reaction products of the impurities, sodium sulfide, carbon, and sodium phenolate, are left behind by the vapors as solids. These solids build up in the sodium contactors, while the hydrogen, nitrogen, and low-boiling paraffins and olefins are separated from the purified oil as non-condensable vent gases when the oil vapors are condensed. Thus, by using the invention in the treatment of a light oil recovered from coal tar, the condensed vapors yield a product consisting essentially of a mixture of benzene, toluene and xylene.

Accordingly, it is an object of the present invention to purify a hydrocarbon oil which contains a major proportion of vaporizable aromatic hydrocarbons and minor proportions of other vaporizable components, for example including olefinic hydrocarbons, paraffinic hydrocarbons, phenolic compounds, moisture, and sulfur compounds by steps including vaporizing the impure oil, and, in a single step, by contact with a body of an inorganic molecular sieve adsorbent, adsorbing the olefins, paraffins, and moisture from the vapor, then removing the sulfur compounds and phenolic compounds by contracting the hot vapor with a support material containing a deposit of molten alkali metal, positively agitating the support material to maintain the support material in the form of a suspension, recovering the purified aromatic hydrocarbons, and periodically regenerating the selective adsorbent by passing a portion of the purified aromatic hydrocarbon vapors, at a temperature of between about 200° C. and 300° C., through the adsorbent body.

A suitable apparatus is illustrated schematically in the attached drawings.

Washed light oil is fed from a storage means, not shown, by a pump 1 to one or more light oil vaporizers 2. Two pumps may be utilized in parallel so that one of these may be shut down if required. Two or more identical apparatus units may be connected in parallel, similarly to the pumps just described, whereby one unit may always remain in operation whenever it becomes necessary to temporarily discontinue the use of another of the units. Such duplication is shown for some of the apparatus units in the drawing, and may also be used in instances where it is not illustrated.

From the light oil vaporizers a conduit leads to a dehydrating apparatus 3, which may consist of one or more packed adsorption towers. The adsorbent is preferably a molecular sieve selective adsorbent capable of adsorbing water, and in some cases aliphatic hydrocarbons, while not capable of adsorbing substantial amounts of aromatic hydrocarbons. Where the feed oil has substantially different characteristics from the light oil considered herein for purposes of illustration, the adsorbent is chosen accordingly. Molecular sieve selective adsorbents are well known in the art; note for example the patents to Barrer 2,306,610 and 2,413,134, and the patent to Plank et al. 2,698,305. Note also the patent to Drake et al. 2,693,457. As illustrated, the two dehydrators may be connected in parallel for reasons indicated above. Barrer, for example, discloses dehydrated molecular sieve adsorbents such as chabasite, mordenite, and synthetic or modified materials prepared by treating analcite, leucite, and synthetic aluminosilicate gels with solutions of barium chloride or barium bromide. Processes of using these materials for adsorption are also disclosed.

A molecular sieve adsorbent is chosen for the following reasons: (1) The adsorbent is more efficient than dehydrating agents such as calcium chloride. The reasons for completely removing water relate to the fact that water will react with sodium, using up part of the sodium and leaving less available for removing impurities. This would require using an excess of sodium, making the economics of the system unfavorable. If sodium reacts with water, hydrogen is formed, leading to danger from hydrogen explosion. (2) The adsorbent may be selected to allow the desirable constituents of the oil to pass, while adsorbing some of the undesirable material. In the illustrative and preferred embodiment aromatic hydrocarbons are adsorbed in only minute quantities and any aliphatic hydrocarbons are adsorbed substantially entirely. In some cases it is economically feasible to collect adsorbed material such as saturated and unsaturated aliphatic compounds by, for instance, elution from the adsorbent. To regenerate the dehydrating material, means, not shown, is utilized to lead superheated oil vapors through the dehydrators. For the illustrative embodiment herein a suitable temperature for the regeneration vapors is between 200° C. and 300° C. An advantage in utilizing the superheated light oil vapor, in addition to its availability and the excellence of regeneration capabilities, is that it is unnecessary to remove air from the dehydrators before and after regeneration.

From the dehydrating means a conduit leads to means 4 for superheating the oil, which may again be more than one in number to permit repairs, cleaning, or other operations on one of the units. From the superheaters a conduit leads to one or more sodium (or other alkali metal) contactors 7. As indicated in the drawing, the conduits and valves are so arranged that any number of contactors may be cut out of operation, or any number of them may be operated in series or in parallel.

The illustrated sodium contactors may comprise ribbon type mixers or paddle type mixers in which the spiral ribbon blade or the paddles are mounted on a horizontally rotatable shaft connected to appropriate drive means (details not shown). In operation, suspended solid materials are utilized in the contactors, and the agitating members in the contactors are operated so as to suspend the solid material throughout the space of the contactors so that the vapors will pass therethrough without a substantial pressure drop and with efficient contact of the vapors and solids. Communicating with the sodium contactors is a feed bin 5 for supplying solid particulate carrier material. Also communicating with each contactor is a conduit means connected to an apparatus 6 for supplying molten sodium, or other molten alkali metal. Before charging and using any of the apparatus, such as the contactor, feed conveyor and feed bin, it is purged with dry nitrogen gas supplied from nitrogen cylinders (not shown) for the purpose of removing air from the system.

Leading from each alkali metal contactor 7 is a conveyor means 11 whereby the contactors may be selectively emptied of solids. The solids may be alternatively conducted to the carrier feed bin 5, or to a solids disposal sump 12 containing a vent pipe. Where the solids are conducted to the feed bin, crushing or agglomerating and particle size classification means (not shown) may be utilized for the purpose of obtaining an appropriate particle size of the carrier material. The solids disposal sump may comprise means such as a weir and a settling chamber whereby insoluble solids are settled out and hydrogen gas is passed through the vent pipe. A nitrogen cylinder may be so connected as to flush any hydrogen gas from the sump vent pipe. From the alkali metal contactors conduit means is provided for passing the vapors to a solids separator 8. In the drawing a conventional cyclone is illustrated, although other solids separating means such as a micrometallic filter may be utilized. The solids, such as dust, which are removed from the vapors are passed to conveyor 11 for reutilization as a carrier or for disposal by passage to the solids disposal sump. Conduit means leads from the solids separator to vapor condensers 9, for conducting the vapor to said condensers.

Where light oil is utilized, the condensate consists essentially of benzene, toluene, and xylene. Impurities and byproducts which leave the vapor condensers as non-condensable vent gases include hydrogen, nitrogen, and low boiling saturated and unsaturated aliphatic compounds. The solids leaving the alkali metal contactors comprise alkali metal sulfide, carbon, and sodium phenolate, as well as carrier material originally added. Where unused sodium is also present, and the solids are passed to the sump, nitrogen gas must be used to flush out the hydrogen, as indicated above.

From the vapor condensers conduit means are provided to conduct the condensate to subcoolers 10, and from there to storage.

The vaporizers 2, dehydrators 3, superheaters 4, alkali metal supply means 6, alkali metal contactors 7, and accessory equipment such as conveyors, are heated preferably by means of indirect heat exchange, utilizing as a heat exchange fluid a material which is inert with respect to sodium. A suitable material is straw oil, a liquid petroleum distillate with a viscosity and boiling range between kerosene and lubricating oil, and having a boiling range of about 230° C. to 430° C. In the instant process a straw oil is utilized which has a boiling point of about 250° C. Such heating jackets or coils are not shown, but are well known to those skilled in the art. Straw oil is inert to sodium, and if any leakage should occur in the system whereby the heating fluid would come in contact with sodium, no hazardous condition would result as would be the case if a reactive material, such as water, is used.

The following example is considered illustrative of the best mode of carrying out the invention:

*Example 1*

Light oil, described above, is vaporized at a temperature of about 170° C. The vaporized oil is passed through a cylindrical adsorption tower packed with molecular sieve adsorbent, adapted to selectively adsorb water and aliphatic hydrocarbons, while allowing all but minute quantities of the aromatic hydrocarbons to escape adsorption.

The pressure required for the light oil system is only that required to pass the light oil through the equipment and is obtained by means of the light oil feed pumps. From the dehydrating tower the vapor is passed to a superheater where it is heated to about 235° C. From the superheater the oil vapor is passed through a sodium contactor, wherein sodium carbonate bearing a coating of molten sodium (prepared as described below) is agitated in the contactor, and the superheated vapor passed therethrough. Some of the impurities in the vapor are converted in the sodium contactor to solids including sodium sulfide, carbon, and sodium phenolate. A portion of the built-up solids is removed from the contactor and cooled from 235° C. to about 65° C. before discharging this portion into the solids disposal pipe. This pipe has an open end under water and is connected to a vent pipe, and the vent pipe is connected to a supply of nitrogen gas. The solids discharged from the disposal pipe drop into the water, wherein sodium sulfide and sodium carbonate dissolve in, and sodium reacts with the water. Nitrogen gas is piped to the free vapor space where it serves as a pressure medium for diluting and forcing hydrogen gas to the atmosphere. While the hydrogen is conducted to the atmosphere the dilute solution of sodium sulfide, sodium carbonate and sodium hydroxide will conduct suspended carbon solids to waste. Some solids settle in the sump and may be cleaned periodically therefrom.

A portion of the solids which accumulate in the contactor is put aside to be re-coated with sodium.

It has been found that the method is more efficiently operated where the oil vapor, rather than the liquid oil, is dehydrated. The reason is not fully known to applicant, but in any event the moisture is more readily removed from the vapors. A temperature of about 235° C. for the superheated vapor provides a more efficient reaction than at a lower temperature, at which the light oil would be in the liquid form. As will be apparent it would be possible to maintain this temperature for a liquid light oil only by using substantial pressure. For light oil, where the specified straw oil is utilized as a heat exchange fluid, the temperature of the vaporized light oil may range from about 160° C. to about 250° C. Higher oil temperatures may be utilized, limited primarily by the melting point of the chosen alkali metal and by the choice of a heating medium for vaporizing and heating the oil to be purified.

The method of starting up and charging the sodium contactors will now be described. A solid carrier consisting of sodium carbonate is placed in a sealed feed bin and is transported to a contactor by means of a sealed screw conveyor, for example. After being charged with an amount of sodium carbonate which approximately half fills the contactor, the flow of carrier material is stopped. The contactor, the conveyor, and feed bin are purged with dry nitrogen gas to remove air from the system. After being charged, the sodium carbonate in the contactor is agitated and heated to drive off water vapors and bring the charge to the desired reaction temperature. When the charge reaches a temperature of about 110° C., the required quantity of molten metallic sodium is metered into the contactor. The charge is continuously agitated until the molten sodium is coated on the solid carrier particles and until the charge is brought to the reaction temperature of 235° C. To avoid excessive pressure, the nitrogen gas is of course vented to the atmosphere during the heating. Upon reaching the reaction temperature of 235° C., the contactor vent to the atmosphere is closed and the superheated light oil vapors are passed through the contactor.

The contactors are designed so that the contact time is six seconds, based on a superficial vapor velocity through the contactor of one foot per second, in turn based on the area of the free space within the contactor above the sodium coated carrier charge, while the latter is at rest. This superficial vapor velocity must be kept low to prevent appreciable quantities of the sodium coated carrier from being carried out of the contactor, and deposited in the vapor outlet.

A suitable particle size for the solid carrier ranges from about 10 to about 30 mesh, U.S. sieve series.

While the illustrative embodiment utilizes light oil, obviously other hydrocarbon oils may be purified by the instant invention. In place of the illustrated contactors, the flow of hydrocarbon vapor and contacting material may be concurrent or countercurrent, or the bed may be fluidized, substantially fixed, or a slowly moving bed.

Sodium is the preferred alkali metal, although others such as lithium, potassium, rubidium, and cesium may be utilized. Other equivalent apparatus elements and materials will be obvious to one skilled in the art.

Equivalent materials, such as carriers, may be utilized. For example, other alkali metal carbonates such as potassium and lithium carbonate may be utilized as the carrier in place of sodium carbonate.

I claim:

1. The process of purifying a hydrocarbon oil which contains a major proportion of vaporizable aromatic hydrocarbons and minor proportions of other vaporizable components including olefinic hydrocarbons, paraffinic hydrocarbons, moisture, phenolic compounds, and sulfur compounds, comprising the steps of vaporizing the impure oil, removing the moisture, paraffinic hydrocarbons, and olefinic hydrocarbons by passing the vapor through a body of an inorganic molecular sieve adsorbent which selectively adsorbs said moisture, paraffinic hydrocarbons, and olefinic hydrocarbons, then removing the remaining sulfur compounds and phenolic compounds by contacting the hot vapor with molten alkali metal deposited upon a particulate support material, recovering the purified aromatic hydrocarbons, and periodically regenerating the selective adsorbent by passing a portion of the recovered, purified aromatic hydrocarbon vapors, at a temperature between about 200° C. and 300° C. through said body of adsorbent.

2. The process of claim 1, including the step of agitating the support material by mechanical means to maintain the support material in the form of a suspension.

References Cited in the file of this patent

UNITED STATES PATENTS

| | | |
|---|---|---|
| 1,865,235 | Cross | June 28, 1932 |
| 1,904,183 | Wells | Apr. 18, 1933 |
| 2,045,160 | Moorman et al. | June 23, 1936 |
| 2,077,494 | Smoley | Apr. 30, 1937 |
| 2,773,805 | Vanderbilt et al. | Dec. 11, 1956 |
| 2,818,455 | Ballard et al. | Dec. 31, 1957 |
| 2,866,835 | Kimberlin et al. | Dec. 30, 1958 |
| 2,877,176 | Wolff et al. | Mar. 10, 1959 |
| 2,927,074 | Barger et al. | Mar. 1, 1960 |

OTHER REFERENCES

Chemical and Engineering News, vol. 32, page 4786, Nov. 29, 1954.